(No Model.)

W. SCARFFE.
BELL FOR CAR HORSES.

No. 374,326. Patented Dec. 6, 1887.

Witnesses
Harold Serrell
Chas. N. Smith

Inventor
William Scarffe
per Lemuel W. Serrell
Atty

UNITED STATES PATENT OFFICE.

WILLIAM SCARFFE, OF BROOKLYN, NEW YORK.

BELL FOR CAR-HORSES.

SPECIFICATION forming part of Letters Patent No. 374,326, dated December 6, 1887.

Application filed September 1, 1887. Serial No. 248,445. (No model.)

*To all whom it may concern:*

Be it known that I, WILLIAM SCARFFE, of Brooklyn, in the county of Kings and State of New York, have invented a new and useful Improvement in Bells for Car-Horses; and the following is declared to be a description of the same.

In some cities and towns it is required during Sunday or upon special occasion to silence the bells upon car-horses. These bells are securely attached to the harness of the car-horses, and to remove them in order that the required silence may be maintained, and again replace them, is not only a difficult matter, but one causing inconvenience and delay.

My invention is designed to obviate these difficulties and to permit of readily and effectually silencing the bells of the car-horses; and to this end my invention consists in the bell-clapper and its stem made removable from the bell and its internal suspending-eye by forming the eye of the clapper-stem as a tapering and pointed inclined convolution, that permits of removing the clapper and stem by a partial rotation when in an inclined position to unscrew the helix, and the clapper can be replaced by the reverse movement.

Figure 2:
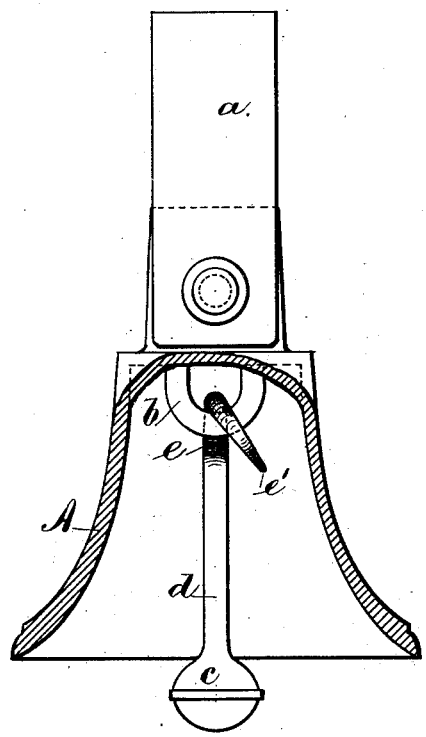
Figure 1:
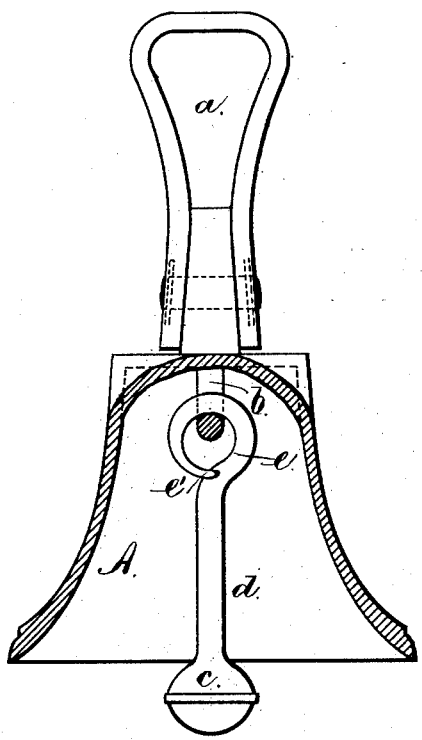
Figure 3:
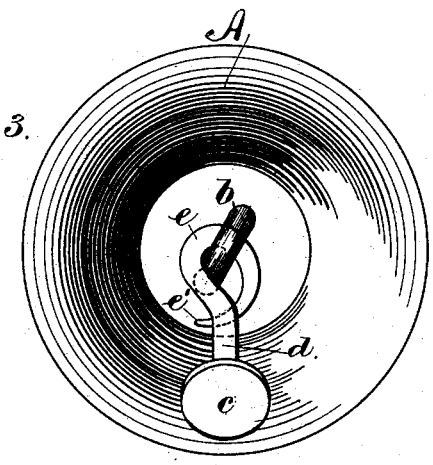

In the drawings, Figure 1 is a vertical section of the bell complete. Fig. 2 is a vertical section of the bell complete at right angles to Fig. 1; and Fig. 3 is a plan of the same, the clapper and stem being inclined for removal.

The bell or gong A may be of any desired shape and material, and it is attached to the harness or a strap by the eye $a$, or in any other desired manner, and there is a metal loop, $b$, formed, as usual, in the inside upper part of the bell, from which the stem and clapper are suspended.

$c$ represents the clapper, $d$ the stem of the same, and $e$ the tapering inclined convolution, forming an open eye, by which it is suspended from the loop $b$, and when in position the parts hang easily and are as free to swing as if the eye $e$ were closed.

When the clapper is to be removed, the stem $d$ is inclined, the clapper touching the bell, and the clapper is grasped by the fingers and given a partial revolution, which turns or unscrews the inclined convoluted eye end $e$ out from the loop $b$, and the parts are separated. They are connected by placing the pointed end $e'$ within the loop $b$ and inclining the stem $d$, with the clapper touching the gong, as before, and then giving the stem a partial rotation in the opposite direction to that before employed, thus screwing the inclined convolution into the loop so that the clapper will be free to hang from the loop $b$ and swing unobstructed.

I claim as my invention—

The combination, with the bell and its internal loop, of a removable clapper having an open suspending-eye that is an inclined convolution capable of being disconnected from or connected to the loop within the bell by the rotation of the clapper when in an inclined position, substantially as specified.

Signed by me this 27th day of August, A. D. 1887.

WILLIAM SCARFFE.

Witnesses:
GEO. T. PINCKNEY,
HAROLD SERRELL.